US 12,152,618 B2

(12) United States Patent
Wan et al.

(10) Patent No.: US 12,152,618 B2
(45) Date of Patent: Nov. 26, 2024

(54) ARC-SHAPED ADJUSTMENT LOCK

(71) Applicant: UNILUMIN GROUP CO., LTD, Shenzhen (CN)

(72) Inventors: Yongguang Wan, Shenzhen (CN); Yulong Xiao, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 181 days.

(21) Appl. No.: 17/857,373

(22) Filed: Jul. 5, 2022

(65) Prior Publication Data

US 2022/0333625 A1 Oct. 20, 2022

Related U.S. Application Data

(63) Continuation of application No. PCT/CN2020/121067, filed on Oct. 15, 2020.

(30) Foreign Application Priority Data

Jan. 17, 2020 (CN) .......................... 202010054703.8

(51) Int. Cl.
*F16B 2/18* (2006.01)
(52) U.S. Cl.
CPC .................... *F16B 2/185* (2013.01)
(58) Field of Classification Search
CPC .. F16B 2/18; F16B 2/185; F16C 11/10; F16C 11/103; G09F 9/301; G09F 9/302;
(Continued)

(56) References Cited

U.S. PATENT DOCUMENTS 4,175,301 A * 11/1979 Letournoux ............ F16C 11/10
297/373
4,375,837 A * 3/1983 van der Lely ......... A01B 71/02
403/97
(Continued)

FOREIGN PATENT DOCUMENTS

CN 202732572 U * 2/2013 .......... G09F 9/3026
CN 203192333 U 9/2013
(Continued)

OTHER PUBLICATIONS

First Office Action issued in counterpart Chinese Patent Application No. 202010054703.8, dated Feb. 1, 2021.
(Continued)

*Primary Examiner* — Josh Skroupa
(74) *Attorney, Agent, or Firm* — Westbridge IP LLC

(57) ABSTRACT

An arc-shaped adjustment lock includes: a base, an adjustment component, and a pressing lock assembly. The base is connected to a first LED cabinet. The base has a first arc-shaped portion. The adjustment component is connected to a second LED cabinet. The adjustment component has a second arc-shaped portion fitted with the first arc-shaped portion. The first arc-shaped portion and the second arc-shaped portion are slidingly matching with two elastic beads along an arc through a staggered double V-shaped groove group. The first arc-shaped portion and the second arc-shaped portion are locked through the pressing lock assembly after sliding along the arc.

7 Claims, 4 Drawing Sheets

(58) Field of Classification Search
CPC ........ G09F 9/3023; G09F 9/3026; G09F 9/33;
H05K 5/0021; H05K 5/0221; H05K
5/0226; Y10T 403/32254; Y10T
403/32262; Y10T 403/32286; Y10T
403/32327; Y10T 403/32336; Y10T
403/32361; Y10T 403/32368; Y10T
403/32418; Y10T 403/32426; Y10T
403/32442; Y10T 403/32451; Y10T
403/32557; Y10T 403/32581; Y10T
403/32591; Y10T 403/595; Y10T 403/608
USPC .... 403/83, 84, 87, 92, 93, 96, 97, 103, 104,
403/106, 107, 113, 116, 117, 322.4, 330
See application file for complete search history.

(56) References Cited

U.S. PATENT DOCUMENTS

| | | | | |
|---|---|---|---|---|
| 5,618,052 | A * | 4/1997 | Rendall | B62J 1/08 403/84 |
| 5,692,721 | A * | 12/1997 | Roberts | B60R 11/00 403/97 |
| 6,575,652 | B2 * | 6/2003 | Krauss | F16D 1/087 403/396 |
| 8,128,306 | B2 * | 3/2012 | Gorza | F16B 7/1454 403/322.4 |
| 9,458,878 | B2 * | 10/2016 | Scatassa | F16C 11/10 |
| 11,178,783 | B2 * | 11/2021 | Dai | H05K 5/0021 |
| 11,933,338 | B2 * | 3/2024 | Adler | F16B 2/185 |
| 2022/0026013 | A1 * | 1/2022 | Liao | F16M 11/2021 |

FOREIGN PATENT DOCUMENTS

| | | | | |
|---|---|---|---|---|
| CN | 203931387 | U | 11/2014 | |
| CN | 104183198 | A | 12/2014 | |
| CN | 105575272 | A | 5/2016 | |
| CN | 107403593 | A | 11/2017 | |
| CN | 207660944 | U | 7/2018 | |
| CN | 207863656 | U | 9/2018 | |
| CN | 208153468 | U | 11/2018 | |
| CN | 108962048 | A | 12/2018 | |
| CN | 111255999 | A | 6/2020 | |
| EP | 1385145 | A1 * | 1/2004 | ............. F16M 11/16 |
| JP | 2006106046 | A | 4/2006 | |
| WO | 2012086873 | A1 | 6/2012 | |
| WO | 2012141525 | A2 | 10/2012 | |

OTHER PUBLICATIONS

International Search Report and Written Opinion issued in corresponding PCT Application No. PCT/CN2020/121067, dated Jan. 20, 2021.

Second Office Action issued in counterpart Chinese Patent Application No. 202010054703.8, dated Sep. 10, 2021.

* cited by examiner

ARC-SHAPED ADJUSTMENT LOCK

CROSS-REFERENCE TO RELATED APPLICATIONS

This application is a continuation application of International Application No. PCT/CN2020/121067, filed on Oct. 15, 2020, which claims priority to Chinese Patent Application No. 202010054703.8, filed on Jan. 17, 2020. The disclosures of the above-mentioned applications are incorporated herein by reference in their entireties.

TECHNICAL FIELD

The present disclosure relates to the technical field of LED display assembly, in particular to an arc-shaped adjustment lock.

BACKGROUND

Nowadays, during the process of assembling multiple LED cabinets of the LED display, in order to make that the angle between two adjacent LED cabinets can be adjusted, the LED cabinets are connected by arc-shaped locks. However, most of the existing arc-shaped locks can only adjust the angle between the two adjacent LED cabinets in a wide range, which cannot meet the customer's demand for adjusting the angle in a small range.

SUMMARY

The main objective of the present disclosure is to provide an arc-shaped adjustment lock.

One aspect of the present disclosure provides an arc-shaped adjustment lock, including: a base, an adjustment component, and a pressing lock assembly. The base is connected to a first LED cabinet. The base has a first arc-shaped portion. The adjustment component is connected to a second LED cabinet. The adjustment component has a second arc-shaped portion fitted with the first arc-shaped portion. The first arc-shaped portion and the second arc-shaped portion are slidingly matching with two elastic beads along an arc through a staggered double V-shaped groove group. The first arc-shaped portion and the second arc-shaped portion are locked through the pressing lock assembly after sliding along the arc.

In an embodiment, the staggered double V-shaped groove group is provided on a side of the first arc-shaped portion close to the second arc-shaped portion, and the two elastic beads are provided on the second arc-shaped portion.

In an embodiment, the staggered double V-shaped groove group includes a first V-shaped groove group for slidingly matching with one of the two elastic beads along the arc and a second V-shaped groove group for slidingly matching with another one of the two elastic beads along the arc. The second V-shaped groove group is located along an extending direction of the first V-shaped groove group.

In an embodiment, the first V-shaped groove group includes a plurality of first V-shaped grooves arranged side by side along an extending direction of the first arc-shaped portion. A first transition groove is provided between adjacent first V-shaped grooves. The second V-shaped groove group includes a plurality of second V-shaped grooves arranged side by side along an extending direction of the first arc-shaped portion; and a second transition groove is provided between adjacent second V-shaped grooves.

In an embodiment, a side of the first arc-shaped portion away from the second arc-shaped portion is provided with an arc-shaped slot hole with a scale line. The second arc-shaped portion is provided with an installation slot of the pressing lock assembly corresponding to the arc-shaped slot hole. The pressing lock assembly is installed in the installation slot of the pressing lock assembly through the arc-shaped slot hole, and the second arc-shaped portion and the first arc-shaped portion are locked after sliding along the arc.

In an embodiment, two arc blocks are provided on both sides of the arc-shaped slot hole, a surface of each of the two arc blocks is provided with first serrations along an extending direction of the surface. The pressing lock assembly includes a handle shaft, a second spring, a T-shaped pressing block and a pressing handle. A fixed end of the handle shaft is passed through the arc-shaped slot hole and fixed on a bottom end of the installation slot of the pressing lock assembly. The second spring and the T-shaped pressing block are sequentially sleeved on a hinged end of the handle shaft, and the pressing handle is hinged on the hinged end of the handle shaft; one end of the pressing handle hinged to the handle shaft is connected to an outer side of the T-shaped pressing block. An inner side of the T-shaped pressing block is provided with second serrations meshing with the first serrations of each of the two arc blocks.

In an embodiment, the staggered double V-shaped groove group is provided on a side surface of the second arc-shaped portion towards the first arc-shaped portion and the two elastic beads are respectively installed on the first arc-shaped portion.

In an embodiment, the staggered double V-shaped groove group includes a first V-shaped groove group for slidingly matching with one of the two elastic beads along the arc and a second V-shaped groove group for slidingly matching with another one of the two elastic beads along the arc. The first V-shaped groove group includes a plurality of first V-shaped grooves arranged side by side along an extending direction of the second arc-shaped portion; a first transition groove is provided between the adjacent first V-shaped grooves. The second V-shaped groove group includes a plurality of second V-shaped grooves arranged side by side along an extending direction of the second arc-shaped portion; and a second transition groove is provided between the adjacent second V-shaped grooves.

In an embodiment, the arc-shaped adjustment lock further includes a quick-lock assembly. The adjustment component is connected to the second LED cabinet through the quick-lock assembly.

In an embodiment, the adjustment component further includes a straight plate installation surface or a straight plate portion located at one end of the second arc-shaped portion. A lock hole is provided on the straight plate installation surface or the straight plate portion. The quick-lock assembly includes a lock cylinder shaft installed on the second LED cabinet, a shaft sleeve with a handle that drives the lock cylinder shaft to rotate, and a third spring that drives the lock cylinder shaft to reset.

In an embodiment, a limit protrusion is provided on the straight plate installation surface or a side surface of the straight plate portion connected to the second LED cabinet, to limit and cooperate with the limit groove provided on the second LED cabinet.

Another aspect of the present disclosure provides an arc-shaped adjustment lock, including: a base, including a first arc-shaped portion; an adjustment component, including a second arc-shaped portion fitted with the first arc-shaped portion, the first arc-shaped portion and the second arc-shaped portion being slidingly matching with two elastic beads along an arc through two V-shaped groove groups, the two elastic beads being respectively matched with the two V-shaped groove groups; and a pressing lock assembly for locking the first arc-shaped portion and the second arc-shaped portion after sliding along the arc. Each of the two V-groove groups includes a plurality of V-grooves. When one of the elastic beads is clamped into a V-shaped groove of one of two V-shaped groove groups, the other elastic bead is located between two adjacent V-shaped grooves of the other of the two V-shaped groove groups.

The details of one or more embodiments of the present disclosure are set forth in the accompanying drawings and the description below. Other features, objects and advantages of the present disclosure will become apparent from the specification, drawings and claims.

BRIEF DESCRIPTION OF THE DRAWINGS

In order to more clearly illustrate the technical solutions in the embodiments of the present disclosure or in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained from these drawings without creative labor.

DETAILED DESCRIPTION OF THE EMBODIMENTS

The specific embodiments of the present disclosure will be further described below with reference to the accompanying drawings. It should be noted herein that the descriptions of these embodiments are used to help the understanding of the present disclosure, but do not constitute a limitation to the present disclosure. In addition, the technical features involved in the various embodiments of the present disclosure described below can be combined with each other as long as they do not conflict with each other.

Figure 1:
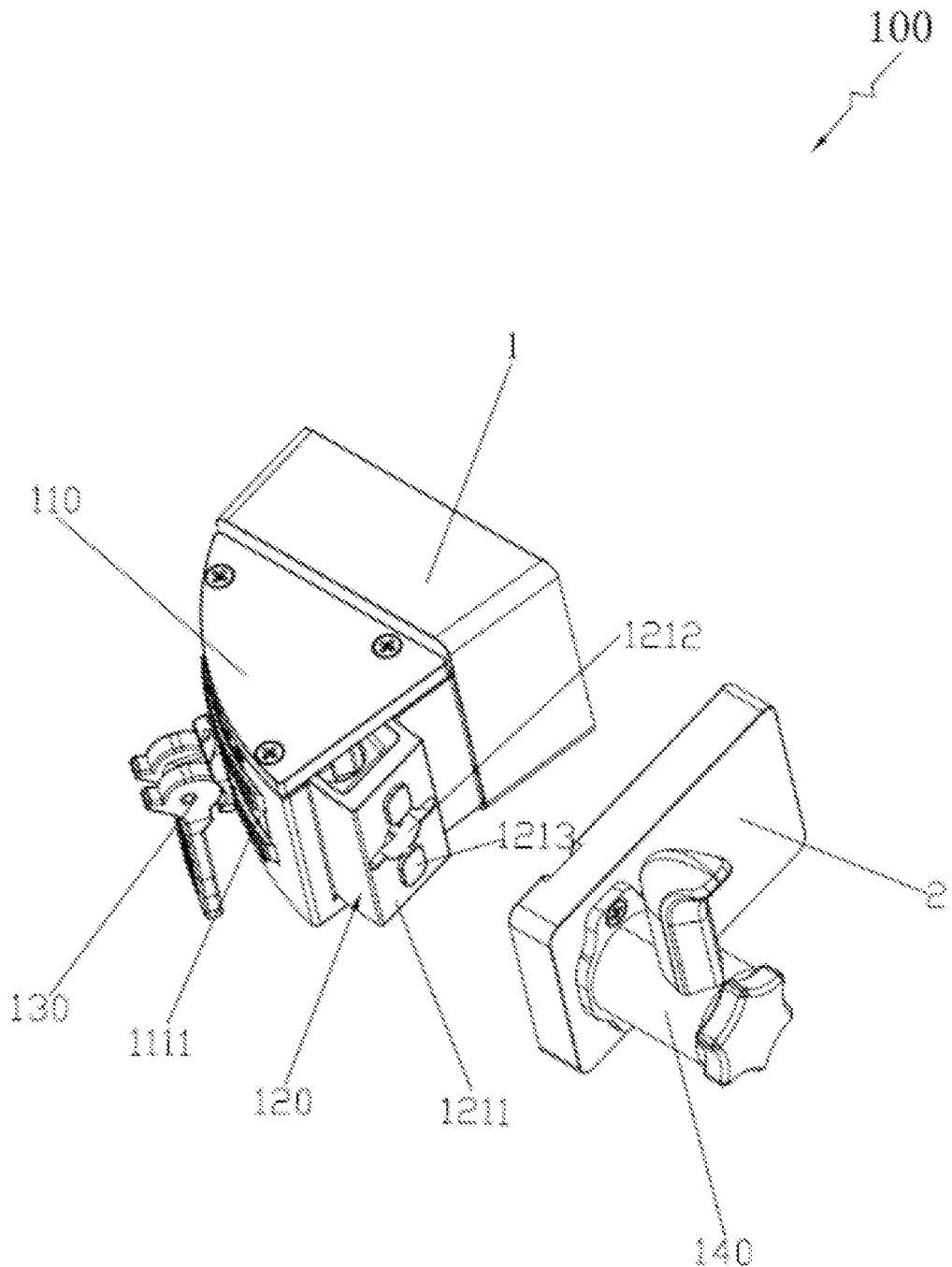
FIG. 1 is a schematic structural view of an arc-shaped adjustment lock according to an embodiment of the present disclosure.
Figure 2:
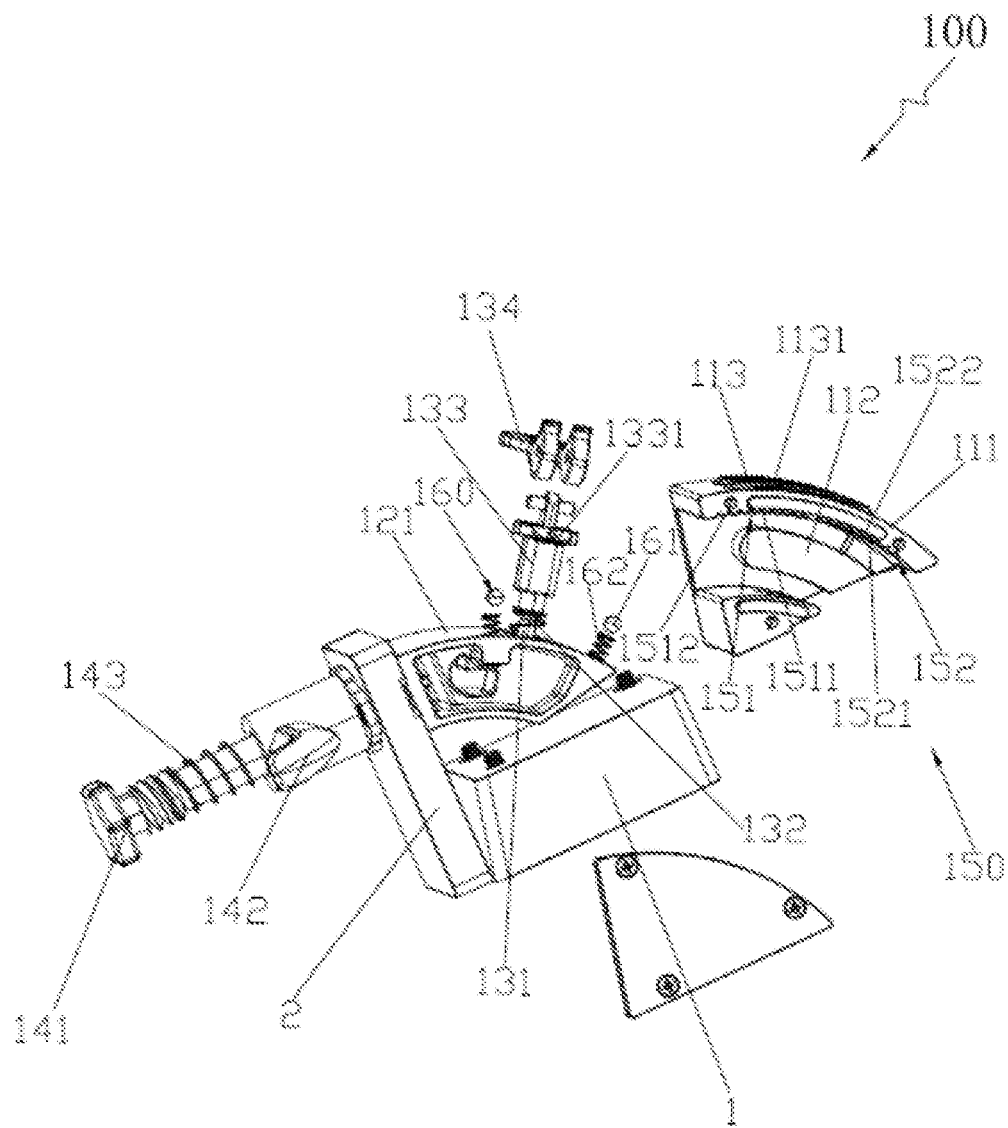
FIG. 2 is an exploded schematic structural view of the arc-shaped adjustment lock shown in FIG. 1.

As shown in FIG. 1 and FIG. 2, the present disclosure provides an arc-shaped adjustment lock 100. The arc-shaped adjustment lock 100 includes a base 110, an adjustment component 120, a pressing lock assembly 130 and a quick-lock assembly 140. The base 110 is connected to a first LED cabinet 1. The base 110 has a first arc-shaped portion 111. The adjustment component 120 is connected to a second LED cabinet 2 through the quick-lock assembly 140. The adjustment component 120 has a second arc-shaped portion 121 fitted with the first arc-shaped portion 111. The first arc-shaped portion 111 and the second arc-shaped portion 121 are slidingly matching with two elastic beads 160 along an arc through a staggered double V-shaped groove group 150, and the first arc-shaped portion 111 and the second arc-shaped portion 121 are locked through the pressing lock assembly 130 after sliding along the arc.

In this embodiment, as shown in FIG. 2, the staggered double V-shaped groove group 150 is provided on a side of the first arc-shaped portion 111 close to the second arc-shaped portion 121, and the two elastic beads 160 are respectively provided on the second arc-shaped portion 121. The staggered double V-shaped groove group 150 includes a first V-shaped groove group 151 for slidingly matching with one of the two elastic beads 160 along the arc and a second V-shaped groove group 152 for slidingly matching with another one of the two elastic beads 160 along the arc, and the second V-shaped groove group 152 is located along an extending direction of the first V-shaped groove group 151. The first V-shaped groove group 151 includes a plurality of first V-shaped grooves 1511 arranged side by side along the extending direction of the first arc-shaped portion 111. A first transition groove 1512 is provided between adjacent first V-shaped grooves 1511. A depth of a first V-shaped groove 1511 is greater than a depth of the first transition groove 1512. The second V-shaped groove group 152 includes a plurality of second V-shaped grooves 1521 arranged side by side along the extending direction of the first arc-shaped portion 111. A second transition groove 1522 is provided between adjacent second V-shaped grooves 1521. A depth of a second V-shaped groove 1521 is greater than a depth of the second transition groove 1522. Each section of a V-shaped groove (i.e., the first V-shaped groove group 151 or the second V-shaped groove group 152) has a scale of 2.5 degrees, and the offset is 1.25 degrees to adjust the angle adjustment within 1.25 degrees. When one elastic bead 160 is located in the first V-shaped groove 1511 or the second V-shaped groove 1521, the other elastic bead 160 is located in the second transition groove 1522 or the first transition groove 1512.

As shown in FIG. 2, the second arc-shaped portion 121 is provided with two elastic bead installation grooves, and the two elastic beads 160 are installed on the two elastic bead installation grooves in a one-to-one correspondence. Each elastic bead 160 includes an elastic bead body 161 and a first spring 162, and the first spring 162 abuts between the elastic bead body 161 and a bottom wall of the elastic bead installation groove. One side of the second arc-shaped portion 121 is further provided with an arc-shaped guide groove, and an extending direction of the arc-shaped guide groove is the same as that of the second arc-shaped portion 121. One side of the base 110 is provided with an arc-shaped guide block 112 adapted to the arc-shaped guide groove, which can play a certain guiding and limiting role when the arc sliding between the second arc-shaped portion 121 and the first arc-shaped portion 111 is performed. The second arc-shaped portion 121 is slidingly matching with the first arc-shaped portion 111 along the arc through the arc-shaped guide block 112 and the arc-shaped guide groove.

As shown in FIG. 1 and FIG. 2, a side of the first arc-shaped portion 111 away from the second arc-shaped portion 121 is further provided with an arc-shaped slot hole 1111 with a scale line. When the scale is 1.25 degrees, the elastic bead 160 corresponding to the second V-shaped groove group 152 is located in the middle position of 1.25 degrees between 0 degrees and 2.5 degrees, that is, located in the second transition groove 1522. The elastic bead 160 corresponding to the first V-shaped groove group 151 is inserted into the first V-shaped groove 1511 to achieve an angle limit of 1.25 degrees. The second arc-shaped portion 121 is provided with an installation slot of the pressing lock assembly corresponding to the arc-shaped slot hole 1111. The pressing lock assembly 130 is installed in the installation slot of the pressing lock assembly through the arc-shaped slot hole 1111, and the second arc-shaped portion 121 and the first arc-shaped portion 111 are locked after sliding along the arc. Two arc blocks 113 are provided on both sides of the arc-shaped slot hole 1111, a surface of each of the two arc blocks 113 is provided with first serrations 1131 along an extending direction of the surface. The pressing lock assembly 130 includes a handle shaft 131, a second spring 132, a T-shaped pressing block 133 and a pressing handle 134. A fixed end of the handle shaft 131 passes through the arc-shaped slot hole 1111 and is fixed on a bottom end of the installation slot of the pressing lock assembly. The second spring 132 and the T-shaped pressing block 133 are sequentially sleeved on a hinged end of the handle shaft 131, and the pressing handle 134 is hinged on the hinged end of the handle shaft 131. One end of the pressing handle 134 hinged to the handle shaft 131 is connected to an outer side of the T-shaped pressing block 133. An inner side of the T-shaped pressing block 133 is provided with second serrations 1331 meshing with the first serrations 1131 of each of the two arc blocks 113. When the pressing handle 134 is pressed downward, the second serrations 1331 inside the T-shaped pressing block 133 are meshed with the first serrations 1131 of each arc block 113, and the whole is in a pressed state. When the pressing handle 134 is rotated upward, the T-shaped pressing block 133 bounces up under the elastic restoring action of the second spring 132, and the second serrations 1331 inside the T-shaped pressing block 133 are separated from the first serrations 1131 of each arc block 113.

As shown in FIG. 1 and FIG. 2, one end of the second arc-shaped portion 121 is a straight plate installation surface 1211. A lock hole 1212 is provided on the straight plate installation surface 1211. The quick-lock assembly 140 includes a lock cylinder shaft 141 installed on the second LED cabinet 2, a shaft sleeve 142 with a handle that drives the lock cylinder shaft 141 to rotate, and a third spring 143 that drives the lock cylinder shaft 141 to reset. When the lock cylinder shaft 141 is pushed into the lock hole 1212 in the horizontal direction, and rotated 90 degrees, the straight plate installation surface 1211 and the second LED cabinet 2 can be locked tightly. Further, the first LED cabinet 1 and the second LED cabinet 2 are locked. In addition, the side surface of the straight plate installation surface 1211 that is connected to the second LED cabinet 2 is provided with a limit protrusion 1213 to limit and cooperate with the limit groove provided on the second LED cabinet 2. The gap is only 0.1 mm to ensure that the cabinet will not be dislocated up and down.

Figure 3:
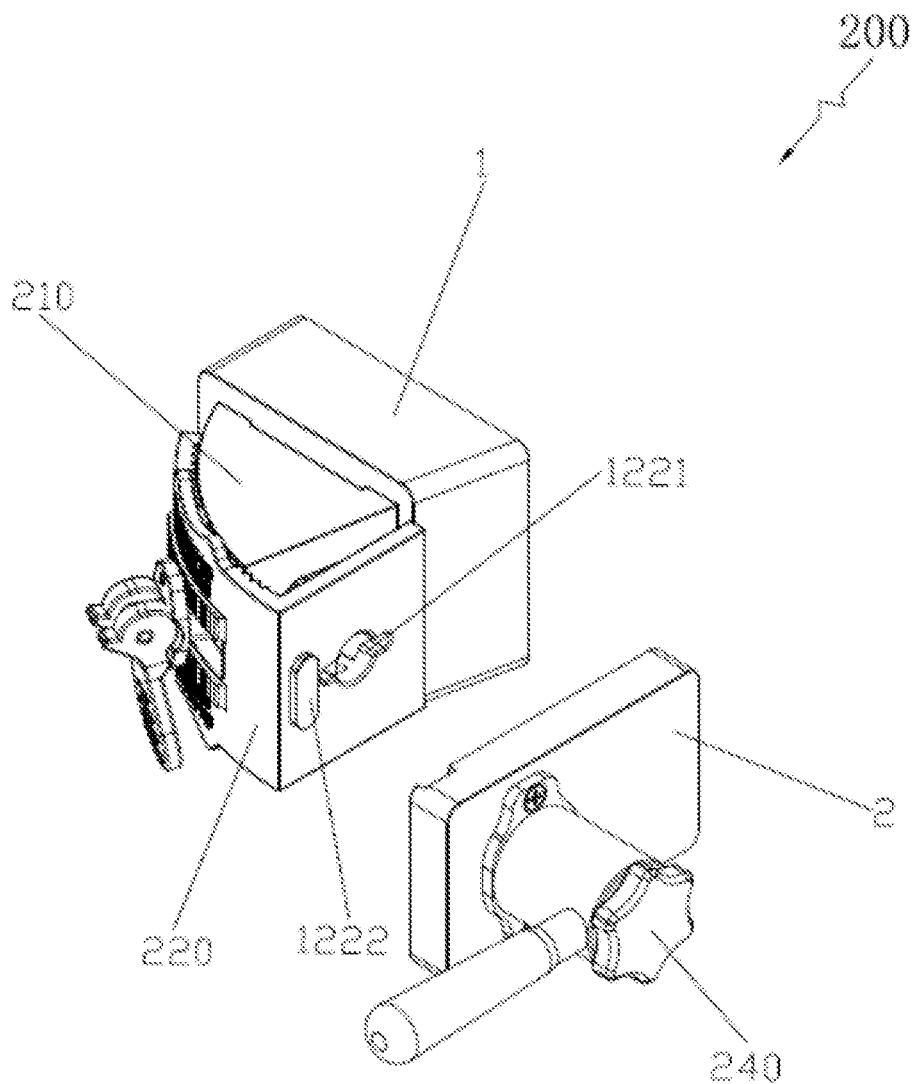
FIG. 3 is a schematic structural view of the arc-shaped adjustment lock according to another embodiment of the present disclosure.
Figure 4:
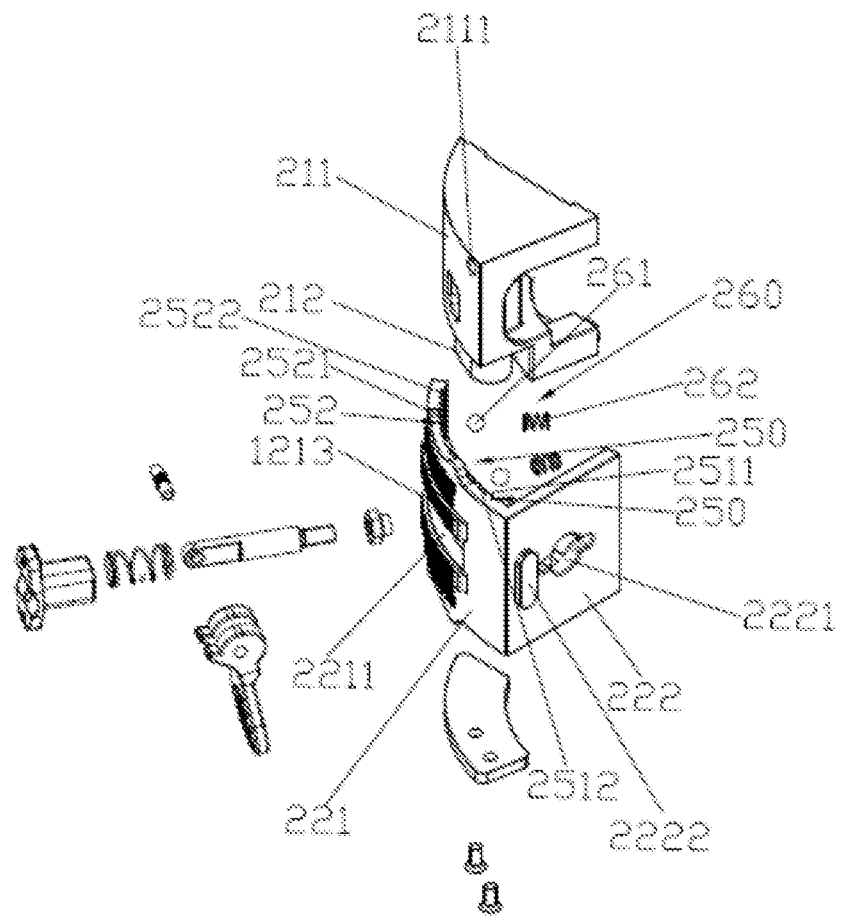
FIG. 4 is a partial exploded schematic structural view of the arc-shaped adjustment lock shown in FIG. 3.

As shown in FIG. 3 and FIG. 4, the present disclosure provides an arc-shaped adjustment lock 200. Compared with the arc-shaped adjustment lock 100, the differences are as follows. The staggered double V-shaped groove group 250 is provided on the side surface of the second arc-shaped portion 221 towards the first arc-shaped portion 211. The two elastic beads 260 are respectively installed on the first arc-shaped portion 211. The staggered double V-shaped groove group 250 includes a first V-shaped groove group for slidingly matching with one of the two elastic beads 260 along the arc and a second V-shaped groove group 252 for slidingly matching with another one of the two elastic beads 260 along the arc. The first V-shaped groove group includes a plurality of first V-shaped grooves 2511 arranged side by side along the extending direction of the second arc-shaped portion 221. A first transition groove 2512 is provided between the adjacent first V-shaped grooves 2511. A depth of the first V-shaped groove 2511 is greater than a depth of the first transition groove 2512. The second V-shaped groove group 252 includes a plurality of second V-shaped grooves 2521 arranged side by side along the extending direction of the second arc-shaped portion 221. A second transition groove 2522 is provided between the adjacent second V-shaped grooves 2521. A depth of the second V-shaped groove 2521 is greater than a depth of the second transition groove 2522. Each section of the V-shaped groove (i.e., the first V-shaped groove group or the second V-shaped groove group 252) has a scale of 2.5 degrees, and the offset is 1.25 degrees to adjust the angle within 1.25 degrees. When one elastic bead 160 is located in the first V-shaped groove 2511 or the second V-shaped groove 2521, the other elastic bead 160 is located in the second transition groove 2522 or the first transition groove 2512.

As shown in FIG. 3 and FIG. 4, the first arc-shaped portion 211 is provided with two elastic bead installation grooves 2111, and the two elastic beads 260 are installed on the two elastic bead installation grooves 2111 in a one-to-one correspondence. The elastic bead 260 includes an elastic bead body 261 and a first spring 262, and the first spring 262 abuts between the elastic bead body 261 and the bottom wall of the elastic bead installation groove 2111. One side of the second arc-shaped portion 221 is further provided with an arc-shaped guide groove, and an extending direction of the arc-shaped guide groove is the same as that of the second arc-shaped portion 221. One side of the base 210 is provided with an arc-shaped guide block 212 adapted to the arc-shaped guide groove, which can play a certain guiding and limiting role when the arc sliding between the second arc-shaped portion 221 and the first arc-shaped portion 211 is performed. The second arc-shaped portion 121 is slidingly matching with the first arc-shaped portion 111 along the arc through the arc-shaped guide block 112 and the arc-shaped guide groove.

As shown in FIG. 3 and FIG. 4, the adjustment component 220 further includes a straight plate portion 222 located at one end of the second arc-shaped portion 221. The straight plate portion 222 is provided with a lock hole 2221. The quick-lock assembly 240 includes a lock cylinder shaft installed on the second LED cabinet 2, a shaft sleeve with a handle that drives the lock cylinder shaft to rotate, and a third spring that drives the lock cylinder shaft to reset. When the lock cylinder shaft is pushed into the lock hole 2221 in the horizontal direction, and rotated 90 degrees, the straight plate portion 222 and the second LED cabinet 2 can be locked tightly. Further, the first LED cabinet 1 and the second LED cabinet 2 are locked. In addition, a side surface of the straight plate portion 222 that is connected to the second LED cabinet 2 is provided with a limit protrusion 2222 to limit and cooperate with the limit groove provided on the second LED cabinet 2. The gap is only 0.1 mm to ensure that the cabinet will not be dislocated up and down.

The present disclosure provides an arc-shaped adjustment lock, including a base, an adjustment component, a pressing lock assembly, and a quick-lock assembly. The base has a first arc-shaped portion. The adjustment component has a second arc-shaped portion fitted with the first arc-shaped portion. The first arc-shaped portion and the second arc-shaped portion are slidingly matching with two elastic beads along the arc through a staggered double V-shaped groove group, and the first arc-shaped portion and the second arc-shaped portion are locked through the pressing lock assembly after sliding along the arc. When using, the base is connected to the first LED cabinet, and the adjustment component is connected to the second LED cabinet through the quick-lock assembly. The staggered double V-shaped groove group is slidingly matching with the two elastic beads along the arc, and the second arc-shaped portion of the adjustment component can slide along the first arc-shaped portion of the base. Finally, the first arc-shaped portion and the second arc-shaped portion are locked through the pressing lock assembly after sliding along the arc, and the arc application and installation operation between the two adjacent LED cabinets of the LED display can be realized. The staggered double V-shaped groove group is slidingly matching with the two elastic beads along the arc to adjust the angle in a small range.

The embodiments of the present disclosure have been described in detail above with reference to the accompanying drawings, but the present disclosure is not limited to the described embodiments. For those skilled in the art, without departing from the principle and spirit of the present disclosure, various changes, modifications, substitutions and alterations to these embodiments still fall within the scope of the present disclosure.

What is claimed is:

1. An arc-shaped adjustment lock, comprising:
   a base, comprising a first arc-shaped portion;
   an adjustment component, comprising a second arc-shaped portion fitted with the first arc-shaped portion, the first arc-shaped portion and the second arc-shaped portion slidingly matching with two elastic beads along an arc through two V-shaped groove groups, the two elastic beads being respectively matched with the two V-shaped groove groups; and
   a pressing lock assembly for locking the first arc-shaped portion and the second arc-shaped portion after sliding along the arc;
   wherein each of the two V-shaped groove groups comprises a plurality of V-shaped grooves, and when one of the elastic beads is clamped into a V-shaped groove of one of two V-shaped groove groups, the other elastic bead is located between two adjacent V-shaped grooves of the other of the two V-shaped groove groups.

2. The arc-shaped adjustment lock of claim 1, wherein the two V-shaped groove groups are provided on one of the first arc-shaped portion and the second arc-shaped portion, and the two elastic beads are installed on the other of the first arc-shaped portion and the second arc-shaped portion.

3. The arc-shaped adjustment lock of claim 1, wherein each of the two V-shaped groove groups comprises a transition groove between adjacent V-shaped grooves, and when one of the two elastic beads is clamped into a V-shaped groove of one of the two V-shaped groove groups, the other of the two elastic beads is located on the transition groove of the other of the two V-shaped groove groups.

4. The arc-shaped adjustment lock of claim 1, wherein the two V-shaped groove groups are located in the same extending direction.

5. The arc-shaped adjustment lock of claim 1, wherein:
   a side of the first arc-shaped portion away from the second arc-shaped portion is provided with an arc-shaped slot hole with a scale line;
   the second arc-shaped portion is provided with an installation slot of the pressing lock assembly corresponding to the arc-shaped slot hole; and
   the pressing lock assembly is installed in the installation slot of the pressing lock assembly through the arc-shaped slot hole, and the second arc-shaped portion and the first arc-shaped portion are locked after sliding along the arc.

6. The arc-shaped adjustment lock of claim 5, wherein:
   two arc blocks are provided on both sides of the arc-shaped slot hole, a surface of each of the two arc blocks is provided with first serrations along an extending direction of the surface;
   the pressing lock assembly comprises a handle shaft, a second spring, a T-shaped pressing block and a pressing handle;
   a fixed end of the handle shaft passes through the arc-shaped slot hole and is fixed on a bottom end of the installation slot of the pressing lock assembly;
   the second spring and the T-shaped pressing block are sequentially sleeved on a hinged end of the handle shaft, and the pressing handle is hinged on the hinged end of the handle shaft;
   one end of the pressing handle hinged to the handle shaft is connected to an outer side of the T-shaped pressing block; and
   an inner side of the T-shaped pressing block is provided with second serrations meshing with the first serrations of each of the two arc blocks.

7. The arc-shaped adjustment lock of claim 1, further comprising:
   a quick-lock assembly;
   wherein the adjustment component is configured to be connected to a second LED cabinet through the quick-lock assembly.

* * * * *